July 18, 1944. J. R. McMAHON ET AL Re. 22,518
APPARATUS FOR APPLYING PROTECTIVE COATINGS TO SUSPENDED WIRES, CABLES, PIPES, AND THE LIKE
Original Filed Dec. 9, 1939 2 Sheets-Sheet 1
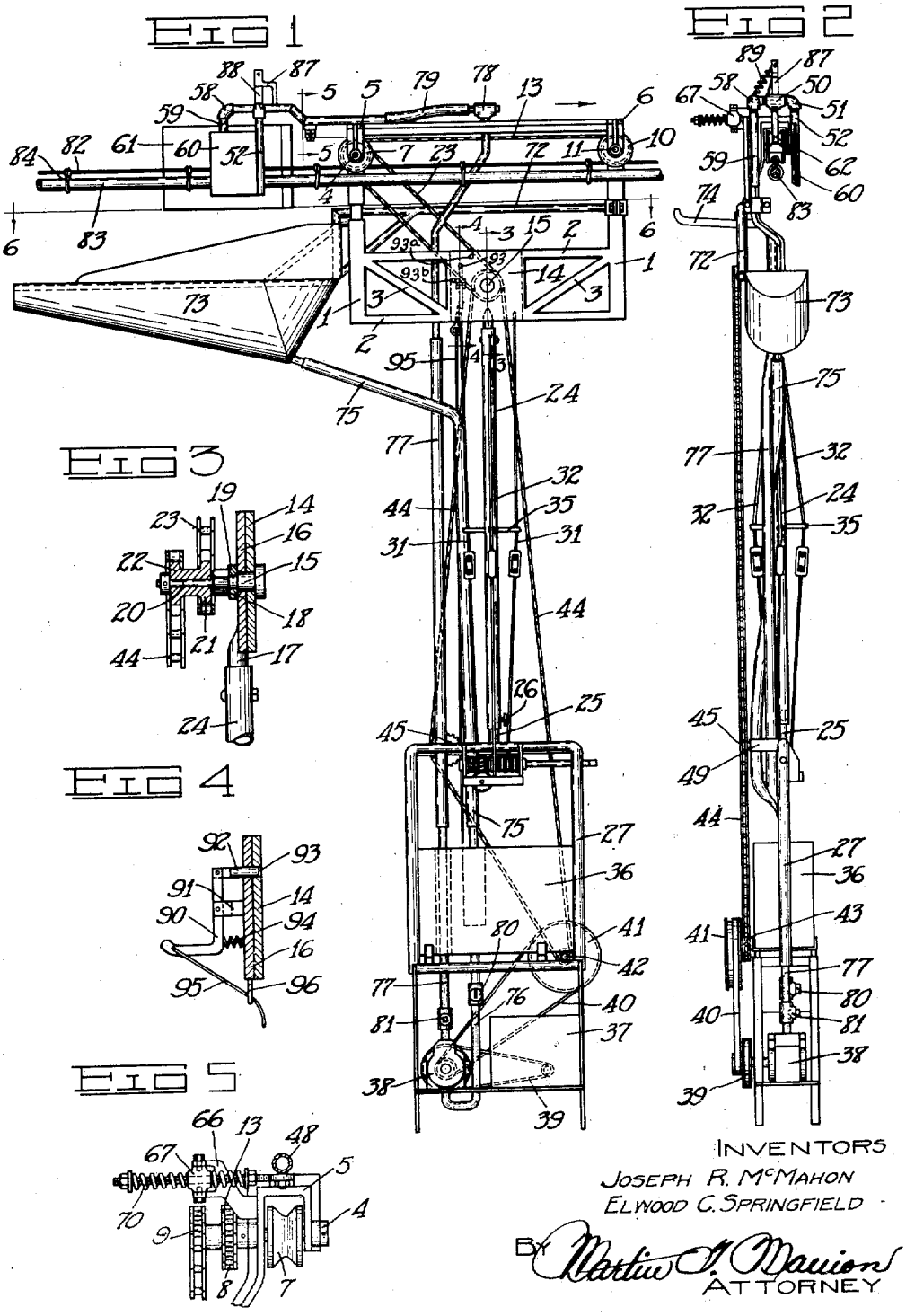
INVENTORS
JOSEPH R. McMAHON
ELWOOD C. SPRINGFIELD
BY Martin J. Mannion
ATTORNEY July 18, 1944. J. R. McMAHON ET AL Re. 22,518
APPARATUS FOR APPLYING PROTECTIVE COATINGS TO SUSPENDED WIRES, CABLES, PIPES, AND THE LIKE
Original Filed Dec. 9, 1939 2 Sheets-Sheet 2
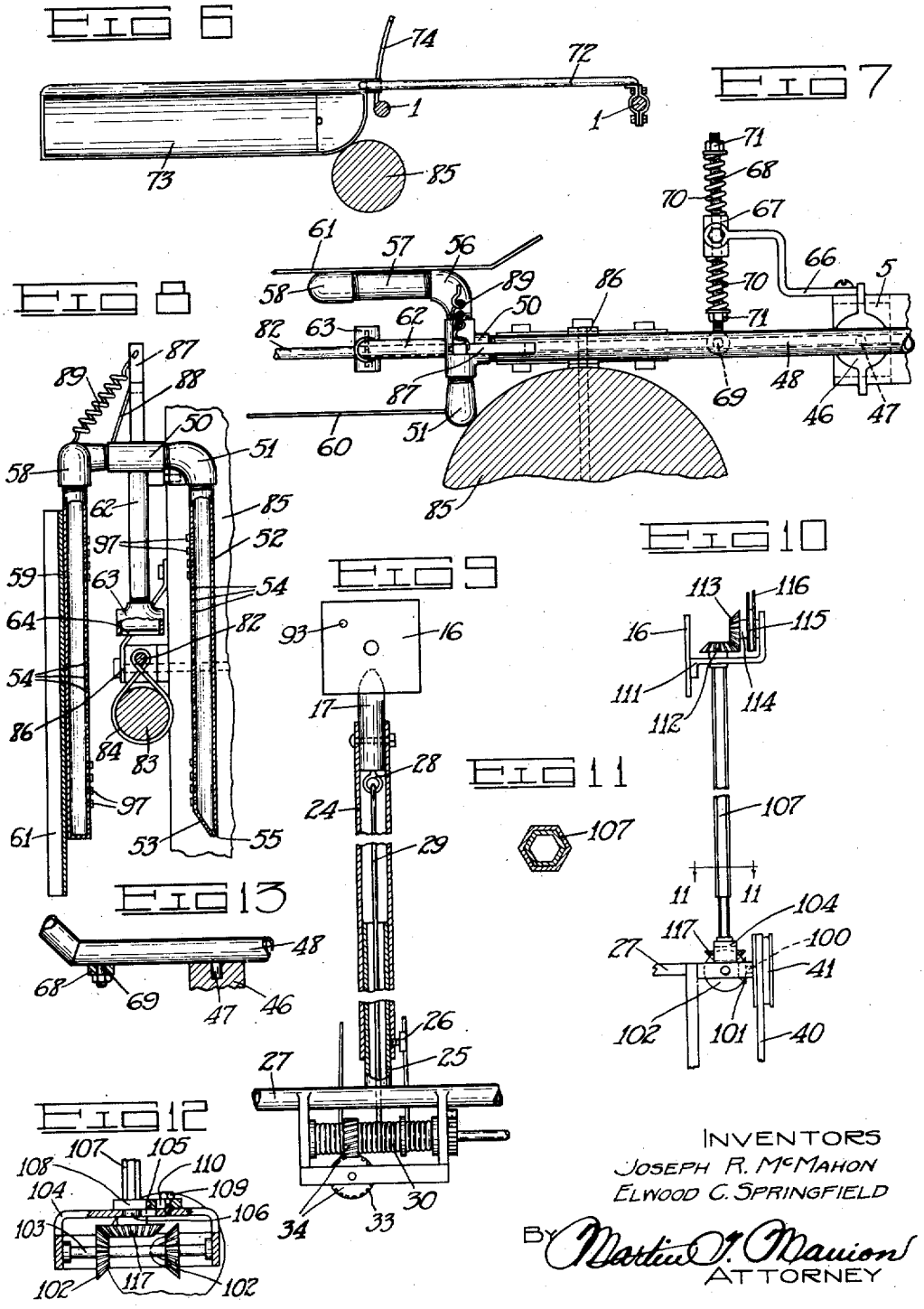
INVENTORS
JOSEPH R. McMAHON
ELWOOD C. SPRINGFIELD
BY Martin J. Mannion
ATTORNEY Reissued July 18, 1944

Re. 22,518

UNITED STATES PATENT OFFICE 22,518

APPARATUS FOR APPLYING PROTECTIVE COATINGS TO SUSPENDED WIRES, CABLES, PIPES, AND THE LIKE

Joseph R. McMahon and Elwood C. Springfield, Glendale, W. Va.

Original No. 2,264,048, dated November 25, 1941, Serial No. 308,340, December 9, 1939. Application for reissue May 13, 1942, Serial No. 442,862

10 Claims. (Cl. 91—44)

This invention relates broadly to apparatus for coating wires, cables, pipe, and the like, and relates more specifically to an apparatus for applying a protective coating or paint to the messenger wires and cables suspended between adjacent supporting poles.

One of the objects of the invention is to provide such an apparatus which is self-propelled along the messenger wire and cable during the coating operation and which may be controlled by a workman or workmen located on the ground below the wire and cable being coated.

Another object of the invention is to provide an apparatus of the character referred to which will economically and effectively coat or paint the wire and cable with substantially no loss of paint or other protective coating material being applied.

Another object of the invention is to provide an apparatus which will coat the wire and cable on all exposed areas including that section of the wire and cable which are attached to a supporting pole.

Another object of the invention is to provide a coating apparatus which may be conveniently and readily passed about a pole supporting the wire and cable with a minimum of time and effort on the part of the ground crew operating the apparatus.

Another object of the invention is to provide a coating apparatus whose length may be adjusted or varied to accommodate wires or cables located on supporting poles at different heights from the ground.

With these and other objects in view, the invention consists in the novel construction and the combination of parts hereinafter described, reference being had to the accompanying drawings, in which—

Figure 1 is a side elevational view of the apparatus suspended in operating position from a section of messenger wire;

Figure 2 is an end elevational view of the same;

Figure 3 is an enlarged vertical sectional view taken on line 3—3 of Figure 1;

Figure 4 is an enlarged vertical sectional view taken on line 4—4 of Figure 1;

Figure 5 is an enlarged vertical sectional view taken substantially on line 5—5 of Figure 1;

Figure 6 is a detail plan view of the drip pan as viewed on line 6—6 of Figure 1.

Figure 7 is a detail view in top plan of the spraying nozzle;

Figure 8 is an end view of the spraying nozzle, parts being shown in vertical section to illustrate interior construction;

Figure 9 is a detail view of the mechanism for telescoping the depending standard, parts being omitted and other parts being shown in vertical section;

Figure 10 is a detail view illustrating a modified driving means for propelling the apparatus;

Figure 11 is an enlarged horizontal sectional view, taken on line 11—11 of Figure 10;

Figure 12 is a detail view illustrating the driving gears for actuating the mechanism shown in Figure 10; and Figure 13 is a detail view of a fragmentary section of the pipe associated with the spraying nozzle, parts being shown in vertical section.

Referring to said drawings, the apparatus comprises a frame consisting of vertical members 1, horizontal members 2, and angular braces 3, this entire structure being integrally formed. The vertical members have their upper extremities bent upon themselves to form inverted U-shaped ends 5 and 6, respectively. The U-shaped end 5 has journaled therein a shaft 4 to which is fastened a trolley wheel 7. The shaft 4 also carries sprocket wheels 8 and 9. A trolley wheel 10 is fixed to a shaft 11 journaled in the U-shaped end 6 and said shaft 11 also has fixed thereto a sprocket wheel (not shown). A sprocket chain 13 connects the last mentioned sprocket wheel with the sprocket wheel 8.

Located in the frame structure is a rectangular plate 14 which is also formed integrally with the frame. A pin 15 extends through the rectangular plate 14 and supports a complemental plate 16 fastened to the upper end of a depending stud 17. The pin 15 extends through registering apertures provided in the plates 14 and 16, said plates being held together by a nut 18 threaded on the pin 15, a collar 19 being interposed between the nut 18 and the outer surface of the plate 16. The pin 15 extends beyond the nut 18 and has its diameter reduced to form a spindle 20 upon which is freely rotatable a one-piece casting forming dual sprocket wheels 21 and 22. A sprocket chain 23 connects the sprocket wheels 21 and 9. Fastened to the stud 17 is the upper end of a tube 24 in which latter is telescopable a tube 25 of smaller diameter. The tubes 24 and 25 are maintained fixed by a set screw 26, as shown in Figure 9.

Permanently fixed to the lower extremity of the tube 25 is a frame 27, said frame carrying or housing a reservoir for the coating material, pump, power unit, etc., as will hereinafter be specifically described.

As shown in Figure 9, the lower end of the stud 17 is provided with an eye 28 which is disposed interiorly of the tube 24. The upper end of a rope or cable 29 is attached to the eye 28 and extends downwardly interiorly of the tubes 24 and 25 and has its lower end attached to and wound about a winch 30 borne by the frame 27 and adapted to be rotated by a hand crank (not shown). When it is desired to adjust the space between the upper frame and lower frame 27, the set screw 26 is retracted and the cable or rope 29 wound or unwound on or from the winch 30 to cause the tubes 24 and 25 to telescope to raise or lower the frame 27.

A pair of guy wires 31 have their upper ends attached to the plate 14 and have their lower ends attached to and wound about the winch 30. A second pair of guy wires 32 have their upper ends attached to the tube 24 and have their lower ends attached to and wound about a winch 33 which is adapted to be rotated by means of spiral gears 34 borne by the winches 30 and 33. The guy wires 31 and 32 are spaced away from the tube 24 by a spider 35. Obviously, the purpose of the guy wires is to afford the required rigidity between the upper and lower frames. The fact that the guy wires may be wound about the two winches makes it possible to take up the slack in the guy wires as the lower frame 27 is raised or lowered.

A tank 36 is carried by the frame 27 to serve as a reservoir for the coating material. A suitable power unit 37 (which may be operated either electrically or by an internal combustion engine) is also supported upon the frame 27. Power from the unit 37 is transmitted to a pump 38 by a belt 39. A belt 40 connects the rotor of the pump 38 to a pulley 41 carried by a shaft 42. The shaft 42 has fixed thereto a smaller sprocket wheel 43 which is connected to the sprocket wheel 22 by a sprocket chain 44. An idler sprocket wheel 45 is laterally movable in a slot provided in a bracket 49 attached to the frame 27 and the idler sprocket wheel 45 meshes with the sprocket chain 44. The idler sprocket wheel 45 may be adjusted in its slot in the bracket 49 so as to afford tension on the sprocket chain 44 regardless of the position of the lower frame 27 with respect to the upper frame.

A boss 46 is formed on the upper surface of the U-shaped end 5 of the upper frame, said boss having a recess formed in its surface to embrace a stub pivot pin 47 provided on the under surface of a section of pipe 48. A T 50 is provided on the end of a section of the pipe 48, the connection between the pipe 48 and T 50 being such that the T is freely rotatable without chance of leakage. An L 51 is connected to one side of the T 50, this connection also being a loose one so as to permit rotation of the L in the T without chance of leakage. Threaded in the L 51 and depending downwardly therefrom is a length of tubing 52, the lower end of which is closed on an angle, as shown at 53. The inner face of the tubing 52 is provided with a series of vertically aligned discharge ports 54. A discharge port 55 is also provided in the lower end of the tubing 52.

Connected to the opposite end of the T 50 is an L 56, in which is threaded a nipple 57, to which latter is connected an elbow 58. A section of tubing 59 is threaded in the elbow 58 and said tubing depends therefrom. The lower end of the tubing 59 is closed, as shown in Figure 8, and the inner face of the tubing is also provided with a series of vertically aligned ports 54. The connection between the nipple 57 and the elbow 58 is a loose one so as to permit free rotation of the elbow on the nipple without chance of leakage. A metal shield 60 is fastened to the tube 52, while another metal shield 61 is fastened to the tubing 59.

A length of tubing 62 depends from the T 50 and is appropriately bent so as to extend downwardly and forwardly. A T-shaped nozzle fitting 63 is threaded to the lower end of the tubing 62 so as to directly overlie the messenger wire 82 and cable 83. A slot 64 is provided in the lower surface of the nozzle 63 to serve as a discharge port.

Extending outwardly from the boss 46 is a bracket 66 having a clevis formed in its free end. Received in the clevis is a trunnion 67 which encircles a pin 68, the latter having one end thereof pivotally received on a stub pin 69 formed on the underside of the pipe 48. Located on opposite sides of the trunnion 67 are oppositely disposed compression springs 70 maintained in position by nuts 71, the asserted force of each of the springs 70 being equal so as to normally maintain the pipe 48 in the position shown in the drawings.

Embracing one of the upright members 1 of the upper frame and freely rotatable thereon is a bracket 72 which supports a drip pan 73 disposed beneath and in vertical alignment with the spraying nozzle hereinbefore referred to. Extending outwardly from the other upright member 1 of the upper frame is an upwardly inclined race 74 which is designed to underlie and afford support to the bracket 72 in the vicinity of the drip pan 73. A suitable conductor 75 leads from the drip pan 73 into the top of the tank 36.

A conductor line 76 leads from the bottom of the tank 36 to the pump 38, and another conductor line 77 leads upwardly from the pump 38 to a T 78. A section of flexible tubing 79 connects the T 78 to the pipe 48. An appropriate valve 80 is provided in the conductor 76 so that the supply of the protective coating material may be controlled from the tank 36. An appropriate fitting 81 is provided in the conductor 77 so that, when desired, air under pressure may be introduced into the line for purposes of cleaning.

When it is desired to apply a protective coating to a section of messenger wire and cable, the apparatus is placed in operating position by placing the trolley wheels 7 and 10 on the messenger wire 82 so that the entire apparatus is freely suspended and depends from the wire 82. In this position, the oppositely disposed tubes 52 and 59 of the spraying nozzle occupy positions on the opposite sides of the messenger wire 82 and the messenger cable 83, which latter is suspended, as usual, from the former by wire clips 84.

Actuation of the power unit 37 results in power being transmitted to the trolley wheels 7 and 10 through belt 39, belt 40, sprocket chains 44, 23, and 13. Such actuation positively drives the trolley wheels 7 and 10 so that the entire apparatus is propelled on and along the messenger wire 82 in the direction indicated by the arrow in Figure 1.

Actuation of the power unit 37, as aforesaid operates, through the belt 39, the pump 38. Such operation of the pump 38 results in an amount of the liquid or semi-liquid protective coating being continuously pumped from the tank 36 through the conductors 76 and 77, as well as through the flexible coupling 79, to the pipe 48. From the pipe 48 the liquid coating is delivered under pressure to the spraying nozzles 52, 59, and 63 through the T 50 and is discharged therefrom through the ports 54 and 64 and a portion of the discharged coating is impinged against the wire 82 and cable 83. The oppositely disposed shields 60 and 61 confine the discharged coating to that area vertically coinciding with the width of the drip pan 73 so that the coating which fails to be impinged on the said wire and cable may gravitate into the drip pan 73 and be drained back into the tank 36 through the drain conductor 75. It will be noted that all exposed areas of the wire 82, cable 83 and clips 84 will be coated on all exposed areas.

When the apparatus in its travel approaches a supporting pole 85 where the messenger wire 82 is attached to and supported by the pole by a clamp 86, the apparatus is propelled to a point where the forward portion of the upper frame contacts the pole 85 or its clamp 86. The ground crew then lifts or maneuvers the apparatus so that the forward trolley wheel 10 is placed on the wire 82 at the opposite side of the pole 85 and its clamp 86. The apparatus then continues its forward travel and coating operation until the rear trolley wheel 7 contacts the pole 85 or its clamp 86, at which time the ground crew elevates the rear portion of the upper frame so as to lift the trolley wheel 7 over the clamp 86 at the opposite side of the pole. Forward travel of the apparatus is continued. When the spraying nozzle contacts the pole 85, as illustrated in detail in Figure 7 of the drawings, the L 51 engages the pole so that the tube 52 of the spraying nozzle is rotated in an arc of a circle from a vertical to a substantially horizontal position because of the provision of the loose connection between the L 51 and T 50. At the same time the T 50, because of the loose connection between it and the pipe 48, is rotated on the pipe 48 so that the L 51 is elevated and the L 56 is lowered. During this action, however, the tube 59 of the spraying nozzle is maintained in a suspended vertical position because of the loose connection between the elbow 58 and the nipple 57. Obviously, this action swings the depending tube 52 upwardly in such a manner that it will not become wedged between the cable and the pole as the apparatus is propelled forwardly. At the same time, however, it will be observed that the wire and cable surface adjacent the pole will be adequately coated because the coating fluid is continuously being discharged through the ports 54 while this action is taking place. The coating liquid is also discharged through the lower port 55 so that the coating is applied between the pole and cable during that time that the nozzle is passing this section of the cable.

At the same time that the spraying nozzle elements are being rotated, as aforesaid, the pipe 48 and the spraying nozzle is being moved outwardly away from the pole 85 as a unit about the pivot 47 against the tension of the outer spring 70 exerted on the trunnion 67. After the L 51 clears the pole, the outer spring 70 forces the trunnion 67 inwardly to restore the spraying nozzle and pipe 48 to their normal positions.

At the same time that the L 51 engages the pole 85 to force the spraying nozzle and pipe 48 outwardly, the rounded forward end of the drip pan 73 also engages the circular surface of the pole 85 so that, during forward travel of the apparatus, the drip pan 73 is also swung outwardly about its pivotal point on the upper frame member 1 so that the drip pan 73 at all times underlies the spraying nozzle to receive the drainage therefrom. During the outward swinging movement of the drip pan 73 the frame 72 rides over the outwardly extending race 74. After the pan has cleared the pole, the same is returned to normal position by reason of the inwardly inclined surface of the race 74.

A bracket 87 is attached to the pipe 48 and extends forwardly to overlie the T 50 and has fixed thereto a downwardly and angularly disposed limit stop 88, the bottom end of which is normally maintained in contacting relation with the T 50 by means of a retractile coil spring 89 which has one end attached to the L 56 and has its opposite end attached to the bracket 87. Rotation of the spraying nozzle with respect to the pipe 48 is achieved against the tension exerted by the spring 89. After the spraying nozzle clears the pole, the nozzle is returned to its normal position by the spring 89, the stop 88 limiting the rotation so that it will cease when the nozzle occupies normal position.

As hereinbefore pointed out, the lower frame 27 is suspended from the upper frame by the telescoping standard 24 and 25, the tube 24 being fastened to the stud 17 of the plate 16, the plate 16 being supported on the pin 15. A latch mechanism is provided to prevent the lower frame 27 from freely swinging in a pendulum-like manner on its supporting pin 15. As shown in Figure 4, this latch mechanism consists of an L-shaped lever 90 which is pivotally mounted to a bracket 91 attached to the plate 16. A pin 92 is provided on the upper end of the lever 90 and is adapted to be received in registering apertures 93 provided in the plates 14 and 16. A compression spring 94 is interposed between the plate 16 and the lower end of the lever 90 and a rope 95 is fastened to the end of the lever 90 and extends through an eye 96 downwardly where its lower end terminates in the vicinity of the lower frame 27. When the apparatus is traveling along a substantially horizontally disposed cable line, the pin 92 is maintained in the registering apertures 93 so that the depending mechanism will occupy a position substantially at the center of gravity. When, however, the apparatus is traveling along an inclined cable, the pin 92 may be withdrawn from the registering apertures 93 by pulling the rope 95 downwardly so that the suspending mechanism is free to seek its own center of gravity to compensate for the angle of angularity of the inclined cable line.

As shown in Fig. 1 of the drawings, two additional apertures 93[a] and 93[b] are provided in the plate 14, one such aperture being disposed at a spaced arcuate distance at each side of the central aperture 93 of the plate 14. When the forward position of the apparatus contacts a pole 85, as hereinbefore described, the pin 92 may be withdrawn from the registering apertures 93 and the suspended mechanism slightly swung rearwardly on its pivot pin 15 to a point where the pin 92 engages the aperture 93[a]. This obviously alters the center of gravity of the suspended mechanism so that the larger portion of the weight is borne by the rear trolley wheel 7. Thus, the ground crew may readily elevate the weight-relieved forward trolley wheel 10 off the messenger wire 82 and thereby conveniently maneuver the forward part of the apparatus around to the opposite side of the pole 85. Following this, the pin 92 is disengaged from the aperture 93[a] and the suspended mechanism swings by gravitation to a point where the pin 92 may again engage the aperture 93 of the plate 14. The apparatus then continues its forward travel and coating operation until such time as it becomes necessary to place the rear trolley wheel 7 on the opposite side of the pole. At this point the pin 92 may be withdrawn from the registering apertures 93 and the suspended mechanism slightly swung forwardly on the pivot pin 15 to a point where the pin 92 engages the aperture 93b. This alters the center of gravity of the suspended mechanism so that the larger portion of the weight is now borne by the forward trolley wheel 10. Consequently, the ground crew may readily elevate the weight relieved rear trolley wheel 7 off the messenger wire 82 and thereby easily maneuver the rear part of the apparatus around to the opposite side of the pole 85. Following this, the pin 92 is disengaged from the aperture 93b and the suspended mechanism swings by gravitation to a point where the pin 92 may again engage the aperture 93 of the plate 14 in its normal relationship.

As shown in Figure 8, removable pins or plugs 97 may be placed in any of the desired ports 54 of the spraying nozzle so as to confine the discharged coating to the region occupied by the wire 82 and cable 83.

A modified form of means of propelling the apparatus is illustrated in Figures 10, 11 and 12 of the drawings. When this latter is utilized, the belt 40 drives the pulley 41 which is attached to a stub shaft 100 journaled in the lower frame 27. Mounted on the inner end of the stub shaft 100 is a bevel gear 101 which meshes with one of a pair of bevel gears 102 borne by a shaft 103, which latter has its opposite ends journaled in the frame 27. A U-shaped plate 104 is fixed to the frame 27 and has a longitudinally extending slot 105 located intermediate its ends. Received in the slot 105 is the circular end 106 of a vertically extending, telescoping, hexagonal drive shaft 107. A bearing plate 108 also accommodates the circular end of the shaft 106, the plate 108 being attached to the U-shaped plate 104 by a machine screw 109 which passes through a slot 110 provided in the bearing plate 108.

The upper end of the shaft 107 is journaled in a bearing provided in an L-shaped bracket 111 which is fixed to the plate 16. A bevel gear 112 is carried by the upper end of the shaft 107 and meshes with a bevel gear 113 borne by a stub shaft 114 journaled in the bracket 111. A sprocket wheel 115 is carried by the stub shaft 114 and is connected to the sprocket 9 by means of a sprocket chain 116. A bevel gear 117 is fixed to the lower end of the shaft 107 and meshes with one or the other of the pair of bevel gears 102, as will hereinafter be fully described.

When the latter modified driving means is utilized, power furnished to the pulley 41 is transmitted to the shaft 107 through the bevel gear 101 and one of the bevel gears 102 and bevel gear 117. The power is transmitted from the shaft 107 through the bevel gears 112 and 113 to the sprocket wheel 115 and chain 116 for rotating and driving the trolley wheels 7 and 10 in one direction.

When it is desired to reverse the direction of travel of the apparatus along the wire or rope, the machine screw 109 is retracted and the bearing plate 108 moved longitudinally so as to bring the bevel gear 117 out of contact with the one gear and mesh the same with the other gear of the pair 102 after which the screw is again tightened. When operated after making this change, the direction of rotation of the gear 117 and shaft 107 will be reversed from that above described to reverse the direction of travel of the apparatus along the wire or rope.

What is claimed is:

1. In apparatus for applying a protective coating to suspended cable lines borne by spaced supporting poles comprising trolley wheels adapted to be propelled along the line by a power plant connected to said trolley wheels and borne by a frame suspended from said trolley wheels, a reservoir containing the coating material borne by said frame, a conductor line from said reservoir to a spraying nozzle normally aligned with the cable line, the section of said conductor line to which the nozzle is attached being pivotally connected to the frame so as to be adapted, along with the nozzle, to be moved transversely with respect to the cable line when the spraying nozzle contacts and is passing an obstructing supporting pole in its travel along the line.

2. In apparatus for applying a protective coating to suspended cable lines borne by spaced supporting poles comprising trolley wheels adapted to be propelled along the line by a power plant connected to said trolley wheels and borne by a frame suspended from said trolley wheels, a reservoir containing the coating material borne by said frame, a conductor line from said reservoir to a spraying nozzle normally aligned with the cable line, the section of said conductor line to which the nozzle is attached being pivotally connected to the frame so as to be adapted, along with the nozzle, to be moved transversely with respect to the cable line when the spraying nozzle contacts and is passing an obstructing supporting pole in its travel along the line, a drip pan pivotally connected to said frame and disposed beneath the spraying nozzle and adapted to be moved transversely about its pivot along with the spraying nozzle when said drip pan contacts and is passing said obstructing pole.

3. In apparatus for applying a protective coating to suspended cable lines borne by spaced supporting poles comprising trolley wheels adapted to be propelled along the line by a power plant connected to said trolley wheels and borne by a frame suspended from said trolley wheels, a reservoir containing the coating material borne by said frame, a conductor line from said reservoir to a substantially U-shaped spraying nozzle disposed about said line, one of the perpendicularly disposed legs of the nozzle being pivotally connected to the yoke of the nozzle so as to be adapted to be forced from its normal perpendicular position when said leg frictionally engages and passes an obstructing supporting pole in its travel along the cable line.

4. In apparatus for applying a protective coating to suspended cable lines borne by spaced supporting poles comprising trolley wheels adapted to be propelled along the line by a power plant connected to said trolley wheels and borne by a frame suspended from said trolley wheels, a reservoir containing the coating material borne by said frame, a conductor line from said reservoir to a substantially U-shaped spraying nozzle disposed about said line, one of the perpendicularly disposed legs of the spraying nozzle being pivotally connected to the yoke of the nozzle so as to be adapted to be forced from its normal perpendicular position when said leg frictionally engages and passes an obstructing supporting pole in its travel along the cable line, said leg having a reduced end with a discharge port therein.

5. In apparatus for applying a protective coating to suspend cable lines borne by spaced supporting poles comprising trolley wheels adapted to be propelled along the line by a power plant connected to said trolley wheels and borne by a frame suspended from said trolley wheels, a reservoir containing the coating material borne by said frame, a conductor line from said reservoir, a spraying nozzle disposed about cable line and being pivotally connected in said conductor line so as to be forced about its pivotal point and out of its normal path of travel along the cable line when the nozzle frictionally engages and is passing an obstructing supporting pole in its travel along the cable line.

6. Apparatus for applying protective coating material to an elongated pole supported member and embodying therein a frame structure having upper and lower portions, trolley wheels carried by the upper portion of the frame structure and adapted for propelled engagement with said member, means providing a telescopic connection between the upper and lower portions of said frame structure, means carried by the upper portion of the frame structure for spraying coating material toward said member, a coating material reservoir carried by one portion of said frame structure, a conduit for delivering coating material from said reservoir to said spraying means, power means carried by said lower portion of the frame structure, and means connecting said power means and said trolley wheels and operative to transmit power therebetween in several relatively telescoped positions of said upper and lower portions of said frame structure.

7. Apparatus for applying protective coating material to an elongated pole supported member and embodying therein a frame structure having upper and lower portions, trolley wheels carried by the upper portion of the frame structure and adapted for propelled engagement with said member, said lower portion of the frame structure including upper and lower telescopically connected parts, means carried by the upper portion of the frame structure for spraying coating material toward said member, a coating material reservoir carried by one portion of said frame structure, a conduit for delivering coating material from said reservoir to said spraying means, power means carried by said lower part of said lower portion of the frame structure, and means connecting said power means and said trolley wheels and operating to transmit power therebetween in several relatively telescoped positions of said upper and lower parts of said lower portion of the frame structure.

8. Apparatus for applying protective coating material to an elongated pole supported member and embodying therein a frame structure having upper and lower portions, trolley wheels carried by the upper portion of the frame structure and adapted for propelled engagement with said member, means providing a telescopic connection between the upper and lower portions of said frame structure, means carried by the upper portion of the frame structure for spraying coating material toward said member, a driven member having an axis disposed transversely of the upper portion of the frame structure, means for transmitting power from said driven member to one of said trolley wheels, a coating material reservoir carried by said frame structure, a conduit for delivering coating material from said reservoir to said spraying means, a power means carried by the lower portion of the frame structure, and means connecting said power means and said driven member to transmit power thereto in several relatively telescoped positions of said upper and lower portions of the frame structure.

9. Apparatus for applying protective coating material to an elongated pole supported member and embodying therein a frame structure having upper and lower portions, trolley wheels carried by the upper portion of the frame structure and adapted for propelled engagement with said member, means providing a telescopic connection between said upper and lower portions of said frame structure, means carried by the upper portion of the frame structure for spraying coating material toward said member, a coating material reservoir carried by one of said portions of said frame structure, a conduit for delivering coating material from said reservoir to said spraying means, power means carried by said lower portion of the frame structure, and means including a telescopic shaft for driving one of said trolley wheels from said power means.

10. Appparatus for applying protective coating material to an elongated pole supported member and embodying therein a frame structure having upper and lower portions, trolley wheels carried by the upper portion of the frame structure and adapted for propelled engagement with said member, means providing a pivotal connection between the upper and lower portions of the frame structure and whereby said lower portion may be swung in a plane parallel to that of the said member about said means as an axis, a driven member arranged coaxially with said means, means providing a driving connection between said driven member and one of said trolley wheels, means providing a telescopic connection between the upper and lower parts of said lower portion of the frame structure, means carried by one of said portions of the frame providing a coating material reservoir, means carried by said upper portion of the frame structure for spraying material toward said member, a conduit for delivering material from said reservoir to said spraying means, power means carried by said lower portion of the frame structure, and means including a telescopic shaft for transmitting power from said power means to said driven member.

JOSEPH R. McMAHON.
ELWOOD C. SPRINGFIELD.